Aug. 22, 1961 H. T. BURDICK 2,996,794

TERMINAL CLIP STRUCTURE

Filed Nov. 8, 1955 3 Sheets-Sheet 1

INVENTOR.
Hugh T. Burdick
BY
Olson & Trexler
atty

INVENTOR.
Hugh T. Burdick
BY: Olson & Trexler
Attys.

TERMINAL CLIP STRUCTURE

Filed Nov. 8, 1955 3 Sheets-Sheet 3

INVENTOR.
Hugh T. Burdick
BY
Olson & Trexler
attys.

2,996,794

TERMINAL CLIP STRUCTURE

Hugh T. Burdick, Berwyn, Ill., assignor to Illinois Tool Works, Chicago, Ill., a corporation of Illinois Filed Nov. 8, 1955, Ser. No. 545,600
5 Claims. (Cl. 29—193.5)

The present invention relates to novel terminal clips of the type adapted to receive a terminal wire or a tube prong in a radio or television chassis or in similar electrical equipment, and more particularly to a novel terminal clip structure for mounting on a printed circuit panel.

In the past, terminal clips for the prongs of radio tubes and the like have usually been either separately applied to a base or printed circuit panel or they have been preassembled with a socket member of insulating material and then applied to the panel. These procedures require individual handling of each clip for each tube prong so that an undue amount of time and labor is expended. Furthermore, terminal or socket clips now in use are often formed so that there is substantially no unobstructed air space between the base of the tube and the circuit panel, and it has been found desirable in certain installations to provide air spaces beneath the tubes in order to promote improved cooling of the tubes.

It is an important object of the present invention to provide novel sheet material terminal clips for receiving tube prongs or the like, which clips are of simple and economical construction and are formed so as to provide a space for air circulation between the bottom of a tube and a circuit panel.

Another object of the present invention is to provide a novel terminal clip structure whereby a plurality of clips of the above described type may be mounted as a unit on a circuit panel so as to eliminate individual handling of each clip.

Still another object of the present invention is to provide novel terminal clips of the above described type which are formed so as to facilitate connection thereof by dip soldering to circuit elements on a printed circuit panel without danger of plugging tube receiving socket portions thereof by the solder.

Other objects and advantages of the present invention will become apparent from the following description and the accompanying drawings wherein:

FIG. 1 is a perspective view showing a terminal or socket clip embodying the principles of this invention;

FIG. 2 is a sectional view showing the clip of FIG. 1 assembled with a circuit panel and receiving a tube prong or the like;

FIG. 3 is a plan view showing a blank including a plurality of terminal clip elements integrally connected to a central body portion;

FIG. 4 is a plan view showing a clip structure including a plurality of terminal clips integrally connected by a body portion and applied to a circuit panel;

Figures 1, 2, 3, 4:
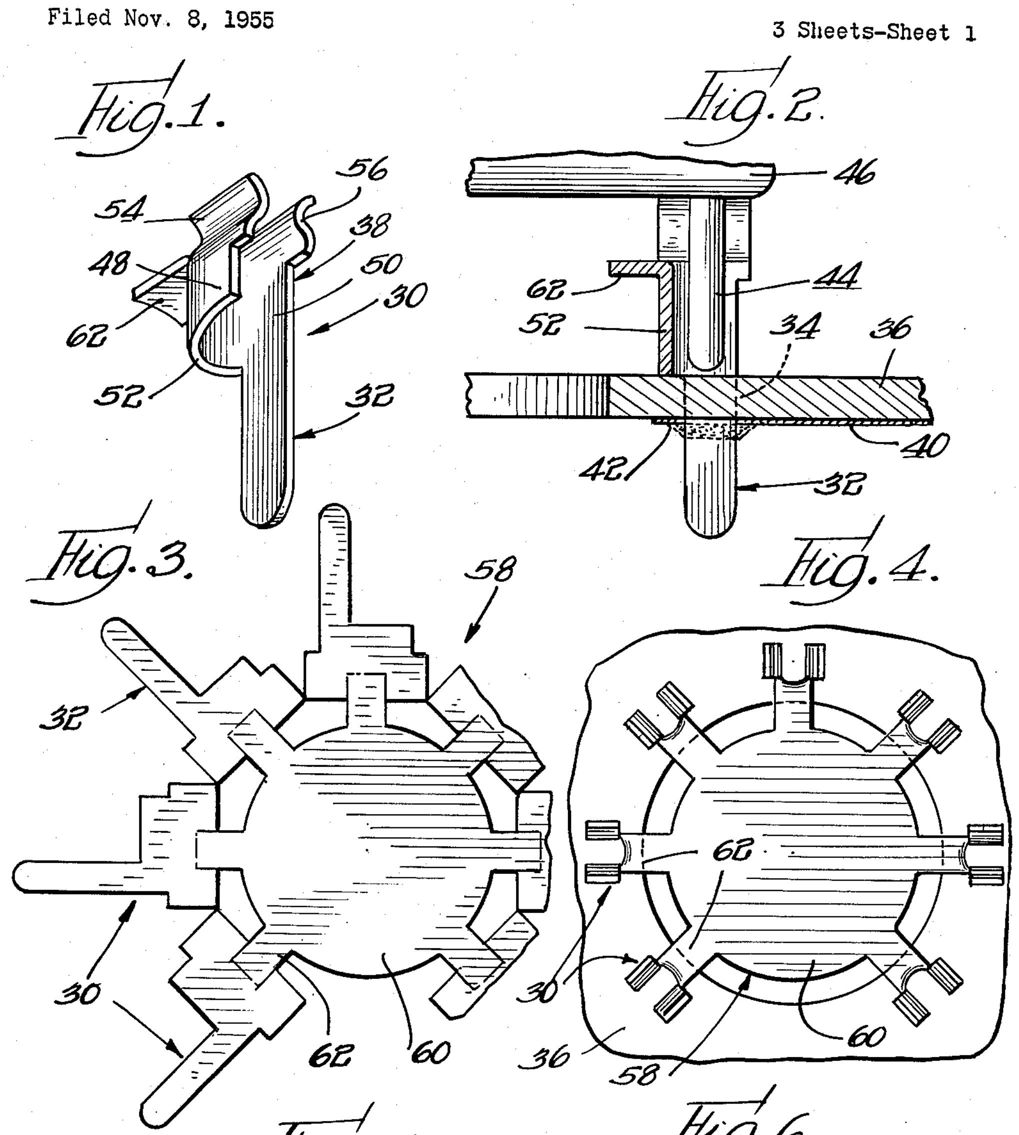

Referring now more specifically to the drawings wherein like parts are designated by the same numerals throughout the various figures, a terminal clip 30 embodying one form of the present invention is shown in FIGS. 1 through 6. The clip 30 is formed from sheet material or metal which is a suitable electrical conductor and includes a finger or stud portion 32 adapted to project through an aperture 34 in a circuit panel 36 and a socket portion 38. While various uses for the clips of the present invention will suggest themselves, the clips are particularly adapted to be applied to a printed circuit panel of the type indicated in FIG. 5. As will be understood, such a panel is usually formed from a suitable plastic material such as Bakelite and has printed thereon elements 40 of copper or other suitable electrical conducting material. The elements 40 are arranged to provide the panel with the desired circuit. After the clips have been inserted into the preformed apertures 34 in the panel, the projecting ends of the finger or stud portions 32 are dip soldered to provide a mass 42 of solder thereon which establishes an electrical connection between the finger portions and the circuit elements 40 and also serve to retain the clips in assembled relationship with the panel.

The socket portion 38 which is adapted to receive a prong 44 of a tube or the like 46 as shown in FIG. 2 includes a pair of upstanding side sections 48 and 50 having lower portions of their upstanding margins integrally joined by a bight section 52. The side section 50 is integral with the stud portion 32 of the clip and the bottom edges of the side section 48 and the bight section 52 provide an abutment engageable with the panel 36 to position the clip with respect to the panel. Upper end portions 54 and 56 of the side sections 48 and 50 respectively extend above the bight portion 52 and are formed inwardly toward each other in the manner shown for resiliently gripping the prong 44. The terminal ends of the portions 54 and 56 are flared away from each other so as to facilitate insertion of the prong 44 therebetween and so as to act as cams to spread the sections 54 and 56 while the prong is being inserted. It should be noted that the height or length of the socket portion 38 is such that the bottom of the tube 46 will be spaced substantially above the panel 36. Furthermore, since a plurality of clips mounted on the panel as shown in FIGS. 5 and 6 for supporting a tube are separated from each other a substantial unobstructed airspace is provided between the panel and the bottom of the tube to promote cooling of the tube.

Figure 5:
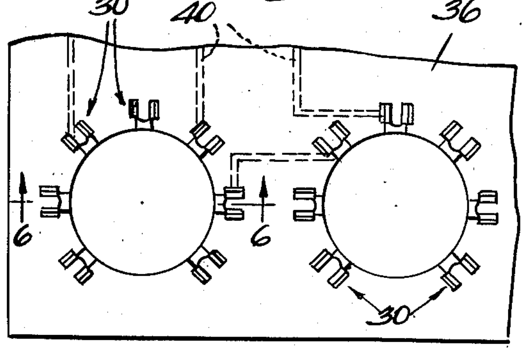
FIG. 5 is a plan view showing a plurality of terminal clips mounted on a printed circuit panel for receiving tube prongs or the like and separated from each other by the removal of the connecting central body portion of the clip structure.
Figure 6:
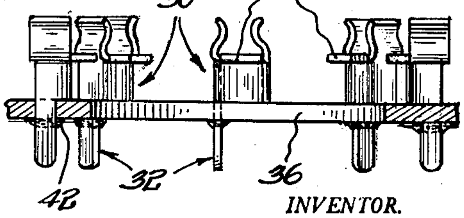
FIG. 6 is an enlarged fragmentary sectional view taken along line 6—6 in FIG. 5.

In order to eliminate individual handling of a plurality of clips 38 when the clips are to be mounted as shown in FIGS. 5 and 6 for receiving a radio tube or the like, the clips 38 are initially formed in a clip structure 58 shown in FIGS. 3 and 4 so that they are integrally connected with each other. More specifically, in addition to a plurality of the terminal clips 38 the clip structure 58 comprises a central body section 60 and a plurality of tabs or connecting sections 62 circumferentially spaced on and extending radially from the body section and respectively integrally connected to upper margins of the bight portions 52. In FIG. 3 the clip structure 58 is shown in blank form. The blank shown in FIG. 3 is acted upon by suitable die means, not shown, so that the socket portion of each of the clip elements is formed in the manner described above and so that the connecting sections or tabs 62 are bent along their junctions with the bight portions 52 to position the clips generally parallel to each other and so that they extend axially with respect to the central body section 60. Then the clip structure is applied to the panel as shown in FIG. 4, and before or after the projecting ends of the clip stud portions have been dip soldered, the connecting sections or tabs 62 are simultaneously severed by die and punch means, not shown, whereby the clips are separated from each other.

Figures 7, 8, 9, 10, 11, 12, 13, 14:
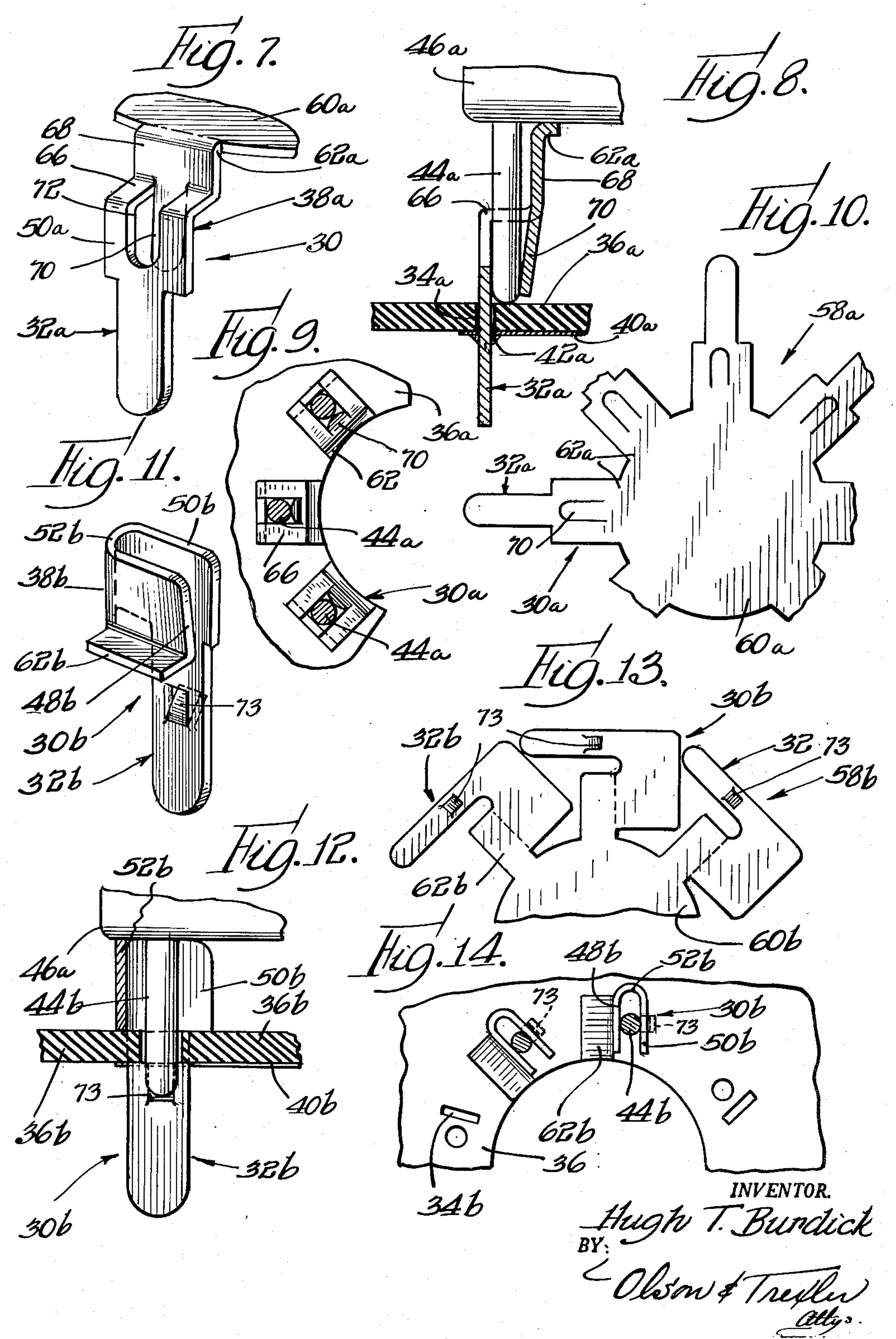
FIG. 7 is a respective view showing a terminal or socket clip embodying a modified form of the present invention.
FIG. 8 is a sectional view showing an assembly including the terminal clip of FIG. 7.
FIG. 9 is a fragmentary plan view showing a plurality of the terminal clips of FIG. 7 assembled with a circuit panel.
FIG. 10 is a fragmentary plan view showing a blank for a clip structure including a plurality of integrally connected clip elements of the type shown in FIG. 7.
FIG. 11 is a perspective view showing a terminal or socket clip embodying another modified form of the present invention.
FIG. 12 is a sectional view showing an assembly including the terminal clip of FIG. 11.
FIG. 13 is a fragmentary plan view showing a blank for a clip structure including a plurality of integrally connected terminal clips of the type shown in FIG. 11.
FIG. 14 is a fragmentary plan view showing a plurality of the FIG. 11 terminal clips assembled with a circuit panel.

FIGS. 7 through 10 show a modified form of the present invention which is similar to the above described embodiment as indicated by the application of identical reference numerals with the suffix "*a*" added to corresponding elements. This embodiment differs in the formation of the socket portion of the clip. More specifically, the socket portion **38*a* has an upstanding side section 50*a* integral with the stud portion 32*a*. The section 50*a* has a laterally extending mid-portion 66 disposed substantially at a right angle to the axis of the stud portion 32*a* and terminates in an upstanding end portion 68 which merges with the connecting section 62*a*. A resilient tab 70 is struck from the horizontal portion 66 and the section 50*a*. This provides the socket portion with an opening or slot 72 for receiving the prong 44*a* of a tube or the like, and the depending resilient tab 70 cooperates with the lower portion of the section 50*a*** resiliently to clamp the prong as shown in FIG. 8.

In FIGS. 11 through 14 there is shown another modified form of the present invention which is similar to the above described structures as indicated by the application of identical reference numerals with the suffix "*b*" added to corresponding elements. In this embodiment the prong gripping portions 54 and 56 of the structure shown in FIGS. 1 through 6 have been eliminated and the side sections **48*b* and 50*b* are disposed so that they are normally spaced a distance which is slightly less than the diameter of a prong to be received whereby they will resiliently engage the prong. In order to effect a savings in stock material, the clips are formed so that their stud portions extend perpendicular to the radii of the central body portion 60*b* as shown in FIG. 13, and the connecting sections 62*b* are joined to the lower edges of the clip side portions 48*b* rather than to the upper edges of the bight portions. While as indicated in FIG. 12, the length or the height of the socket portion 38*b* is relatively reduced so that the air space between the bottom of the tube 46*b* and the panel 36*b* is reduced, the clip structure of this embodiment has advantages in that less stock material is required and in that the formation of the stock portion is simplified. Another feature shown in this embodiment which may also be included in the others is that a resilient tab 73** is struck from the stud portion for positively engaging the underside of the panel. This tab not only retains the clip but also may be used to connect electrically the clip with a circuit element.

Figures 15, 16, 17, 18, 19, 20, 21, 22, 23:
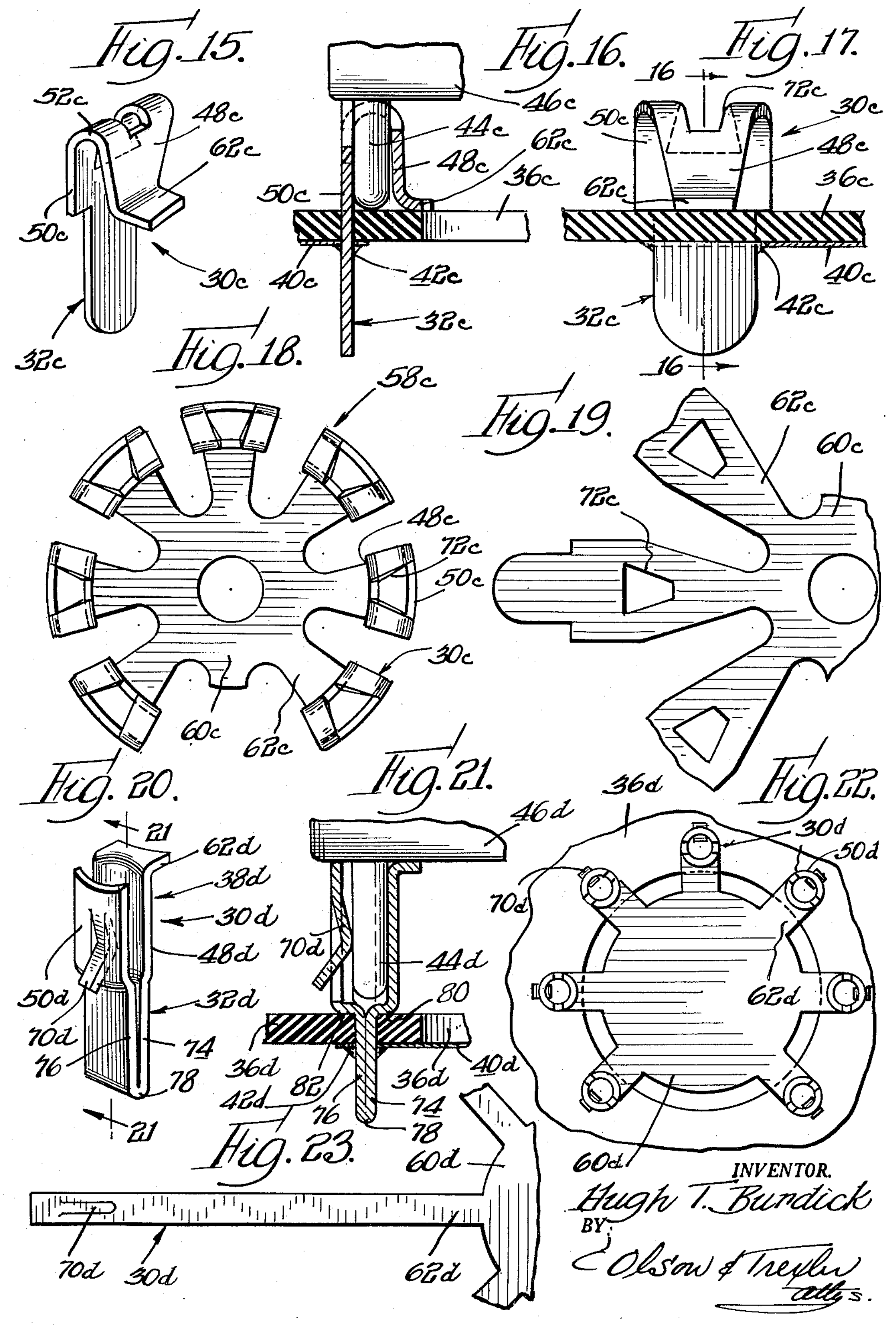
FIG. 15 is a perspective view showing a terminal or socket clip embodying another modified form of the present invention.
FIG. 16 is a sectional view taken along line 16—16 in FIG. 17.
FIG. 17 is a fragmentary elevational view showing an assembly including the terminal clip of FIG. 15.
FIG. 18 is a plan view showing a terminal clip structure including a plurality of integrally connected terminal clips of the type shown in FIG. 15.
FIG. 19 is a fragmentary plan view of a blank for forming a clip structure of FIG. 18.
FIG. 20 is a perspective view showing a terminal or socket clip embodying a further modified form of the present invention.
FIG. 21 is a sectional view showing an assembly including the terminal clip of FIG. 20.
FIG. 22 is a fragmentary plan view showing a clip structure including a plurality of terminal clips of the type shown in FIG. 20 interconnected by a central body portion and applied to the circuit panel.
FIG. 23 is a fragmentary plan view showing a blank from which the clip structure of FIG. 22 is to be formed.

FIGS. 15 through 19 show another embodiment of the present invention which is similar to the above described structures as indicated by the application of identical reference numerals with the suffix "*c*" added to corresponding elements. In this embodiment, the side sections **48*c* and 50*c* of the socket portion are joined along their upper margins by the bight portion 52*c* rather than along upstanding margins. The bight portion is provided with an opening 72*c* defined by converging edges into which opening a tube prong or the like may be inserted and wedged. Preferably, the side section 48*c* is formed so that it normally is inclined from the bight portion toward the side section 50*c* so as to resiliently clamp a tube prong or the like in the manner shown in FIG. 16. In this embodiment the clips 30*c* are initially interconnected by sections 62*c* which extend from the central body portion 60*c* and merge with the lower free ends of the socket side sections 48*c*. After the clip structure has been applied to a panel and the central body portion has been severed, the remaining portions of the connecting sections 62*c* cooperate with the lower edges of the socket side section 50*c*** to position the clips with respect to the panel as shown in FIGS. 16 and 17 and to engage the panel so that both sides of the socket portions are supported whereby any tendency for the socket portions to become deformed or collapsed during insertion of the tube prongs is substantially eliminated.

A further modified form of the present invention is shown in FIGS. 20 through 23, which form is similar to those described above as indicated by the application of identical reference numerals with the suffix "*d*" added to corresponding elements. In this embodiment, the stud portion **32*d* is reversely bent and includes a pair of leg sections 74 and 76 joined at their entering end by a bight portion 78. The side sections 48*d* and 50*d* of the socket portion are respectively integral with and extend upwardly from the leg sections 74 and 76 of the stud portion and they are formed to provide a substantially tubular socket for receiving a prong 44*d* or the like. The lower ends of the socket side sections are formed to provide shoulders 80 and 82 engageable with a panel 36*d* to locate the clip with respect to the panel. A resilient finger 70*d* is struck from the side section 50*d* and projects into the tubular socket for clampingly engaging an inserted tube prong. In this embodiment, a plurality of the clips 30*d* may be initially integrally joined by extending connecting sections 62*d* from upper ends of the side sections 48*d* to a central body member 60*c***.

From the above description it is seen that the present invention has provided novel terminal or socket clips which may be readily formed from sheet metal and which are constructed so that a plurality of the clips may initially be interconnected and applied to a panel as a unit. Furthermore, it is seen that the present invention has provided novel terminal clips which are constructed so as to support a tube or the like in spaced relationship with respect to a circuit panel. It will also be appreciated that the clips of the present invention are formed so that they may readily receive tube prongs or the like and so that they will embrace and resiliently clamp the prongs whereby to insure electrical contact. It should also be noted that the terminal clips constructed in accordance with the present invention may have their stud portions dip soldered without any danger of having their socket portions clogged with solder since the socket portions are disposed entirely at the opposite side of the panel from the stud portion.

While the preferred embodiments of the present invention have been shown and described herein, it is obvious that many structural details may be changed without departing from the spirit and scope of the appended claims.

The invention is claimed as follows:

1. A one-piece sheet metal clip structure for application to a panel or the like having a plurality of annularly arranged openings therein and aperture means therethrough located radially inwardly of said openings, comprising a substantially planar central portion having a laterally outwardly facing margin, and a plurality of annularly arranged clip elements circumferentially spaced around said central portion and disposed outwardly of said margin, each of said clip elements including a single axially extending narrow and flattened stud disposed substantially perpendicular to the plane of said central portion and adapted to be inserted into an opening in a panel or the like, each of said clip elements including an axially opening socket portion adjacent its stud for receiving a prong or the like, each of said socket portions including a pair of oppositely disposed generally axially extending side sections and a bight section connecting said side sections, each of said socket portion side sections having transverse end margins, one end margin of one of said side sections being integrally joined to one of said studs, another of said sections having a margin integrally joined to said outwardly facing margin of the central portion, said central portion being separable from the clip elements after they have been applied to a panel or the like, said side sections of each of said socket portions providing cooperable elements disposed with respect to each other for receiving or gripping a prong or the like inserted therebetween, and said clip elements including abutment surfaces disposed between their stud and socket portion and spaced axially from outer ends of the socket portion for engaging a panel or the like and locating the socket portions substantially entirely at one side of the panel when the clips are fully applied to the panel.

2. A one-piece sheet metal terminal clip, as defined in claim 1, wherein said bight section is disposed between generally axially extending margins of said opposite side sections.

3. A one-piece sheet metal terminal clip, as defined in claim 1, wherein said bight section is disposed between end margins of said opposite side sections, said bight section having opening means therethrough to permit a prong or the like to be passed therethrough and between said sections.

4. A one-piece sheet metal terminal clip, as defined in claim 1, wherein said stud includes a pair of generally parallel legs respectively integral with said opposite side sections and said bight section extends between and joins entering ends of said legs.

5. A one-piece sheet metal terminal clip, as defined in claim 1, which includes tab means struck from and integral with said stud for engaging a side of the panel opposite from said integral means for restraining removal of the stud from said opening.

References Cited in the file of this patent

UNITED STATES PATENTS

| | | |
|---|---|---|
| 2,004,076 | Knutson | June 4, 1935 |
| 2,109,770 | Franklin | Mar. 1, 1938 |
| 2,259,740 | Del Camp | Oct. 21, 1941 |
| 2,269,993 | Schmitt | June 13, 1942 |
| 2,304,808 | Daving | Dec. 15, 1942 |
| 2,480,059 | Stickney | Aug. 23, 1949 |
| 2,575,161 | Deakin | Nov. 13, 1951 |
| 2,613,252 | Heibel | Oct. 7, 1952 |
| 2,689,337 | Burtt | Sept. 14, 1954 |
| 2,727,299 | Klumpp | Dec. 20, 1955 |
| 2,747,169 | Johanson | May 22, 1956 |
| 2,814,024 | Narozny | Nov. 19, 1957 |

FOREIGN PATENTS

| | | |
|---|---|---|
| 201,092 | Great Britain | July 26, 1923 |
| 252,233 | Great Britain | May 17, 1926 |
| 661,989 | Great Britain | Nov. 28, 1951 |